UNITED STATES PATENT OFFICE.

WILHELM EMMERICH, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

RED ACID DYESTUFF OF THE TRIPHENYLMETHANE SERIES AND PROCESS OF MAKING SAME.

1,006,738. Specification of Letters Patent. Patented Oct. 24, 1911.

No Drawing. Application filed December 30, 1910. Serial No. 600,080.

*To all whom it may concern:*

Be it known that I, WILHELM EMMERICH, Ph. D., chemist, a citizen of the Empire of Germany, residing at Höchst-on-the-Main, Germany, have invented certain new and useful Improvements in Red Acid Dyestuffs of the Triphenylmethane Series and Processes of Making Same, of which the following is a specification.

I have found that valuable asymmetrical red acid dyestuffs of the triphenylmethane group can be obtained by condensing the benzaldehyde disulfonic acids with one molecular proportion of a monoalkylaminophenol and one molecular proportion of a dialkylaminophenol. The leuco compounds of these dyestuffs have the general formula:

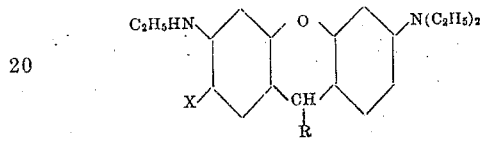

wherein X stands for an alkyl group or hydrogen, R for a residue of benzoldisulfonic acid; said dyestuffs being, in the form of their sodium salts, red to brown powders readily soluble in water, dyeing wool and silk very pure red tints while leaving intermixed cotton threads undyed. The tint of the dyestuffs thus produced lies between the tints of the corresponding symmetrically constituted dyestuffs. These dyestuffs by reason of their excellent solubility have a great advantage over the symmetrical dyestuffs obtainable from aldehydedisulfonic acids and monoalkylaminophenols, which are rather difficultly soluble. The fact that the asymmetrical dyestuffs are of much better solubility than a mixture of the di- and tetralkyl-dyestuffs yielding the same tint, proves that the said products are homogeneous chemical compounds.

The following example illustrates my invention: 31 gr. of sodium salt of benzaldehyde-disulfonic acid are boiled for some hours in diluted, aqueous solution with a slightly acidified solution of 16.5 gr. of diethyl-m-aminophenol and 15.1 gr. of monoethylaminocresol:

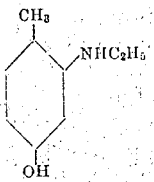

whereupon the asymmetrical leuco-disulfonic acid separates. For closing the pyrone ring, the dry leuco-acid is heated with five times its quantity of sulfuric acid of 66° Bé. for some hours to 130–135° C.; this solution is precipitated with water and the filtered pyrone-disulfonic acid is heated with the necessary quantity of ferric chlorid to 80–100° C. for converting it into the acid of the dyestuff. The leuco compound of this acid dyestuff has the formula:

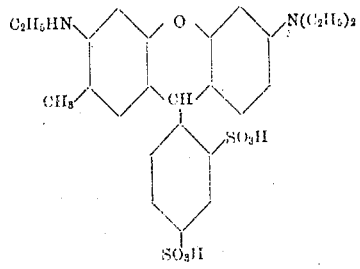

The dyestuff after being completely separated by means of common salt is filtered off, dissolved in sodium carbonate, again filtered and the sodium salt precipitated by means of common salt. The coloring matter forms a brownish-red powder which is readily soluble in water to a bluish-red solution.

Having now particularly described my invention, what I claim is:

1. The process of manufacturing asymmetrical red dyestuffs of the triphenylmethane series, which consists in condensing one molecular proportion of a benzaldehyde-disulfonic acid with one molecular proportion of a monoalkylated and one molecular proportion of a dialkylated m-aminophenol, and in transforming, after the closing of the pyrone ring, the leuco-disulfonic acids thus obtained into the dyestuffs by oxidation.

2. As new products, asymmetrical red acid dyestuffs the leuco compounds of which have the general formula:

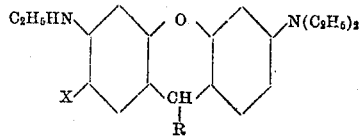

wherein X stands for hydrogen which may be replaced by an alkyl group, R for a residue of benzoldisulfonic acid; said dyestuffs being, in the form of their sodium salts, red to brown powders readily soluble in water, dyeing wool and silk very pure red tints while leaving intermixed cotton threads undyed.

3. As a new product, an asymmetrical red acid dyestuff the leuco compound of which has the formula:

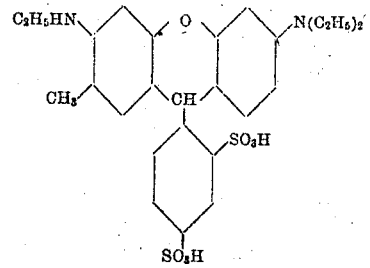

said dyestuff being, in the form of its sodium salt, a brownish-red powder readily soluble in water, dyeing wool and silk a pure bluish-red tint while leaving intermixed cotton threads undyed.

In testimony whereof, I affix my signature in presence of two witnesses.

WILHELM EMMERICH.

Witnesses:
  JEAN GRUND,
  CARL GRUND.